United States Patent
Zhang et al.

(10) Patent No.: US 10,308,846 B2
(45) Date of Patent: Jun. 4, 2019

(54) ULTRA-VIOLET-CURABLE AND MOISTURE-CURABLE ADHESIVE COMPOSITION

(71) Applicants: Henkel AG & Co. KGaA, Duesseldorf (DE); Henkel IP & Holding GmbH, Duesseldorf (DE)

(72) Inventors: Rui Zhang, Shanghai (CN); Daoqiang Lu, Shanghai (CN); Shabbir Attarwala, Simsbury, CT (US)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/309,995

(22) Filed: Jun. 20, 2014

(65) Prior Publication Data

US 2014/0303272 A1    Oct. 9, 2014

Related U.S. Application Data

(63) Continuation of application No. PCT/CN2012/086317, filed on Dec. 11, 2012.

(30) Foreign Application Priority Data

Dec. 22, 2011   (CN) .......................... 2011 1 0435749

(51) Int. Cl.
| | |
|---|---|
| *B32B 37/12* | (2006.01) |
| *C09J 175/16* | (2006.01) |
| *C09J 171/00* | (2006.01) |
| *C09J 143/04* | (2006.01) |
| *C08G 18/67* | (2006.01) |

(52) U.S. Cl.
CPC .......... *C09J 171/00* (2013.01); *B32B 37/1284* (2013.01); *C08G 18/672* (2013.01); *C09J 143/04* (2013.01); *C09J 175/16* (2013.01); *B32B 2037/1253* (2013.01)

(58) Field of Classification Search
CPC ..... C08G 18/672; C09J 171/00; C09J 175/08; C09J 175/16; C09J 143/104; B32B 37/1284
USPC ............... 522/97, 90, 96, 182, 181
See application file for complete search history.

(56) References Cited

U.S. PATENT DOCUMENTS

| | | | |
|---|---|---|---|
| 6,828,355 B1 | 12/2004 | Chu | |
| 7,009,022 B2 * | 3/2006 | Duch | .... C08G 18/10 525/440.03 |
| 7,060,750 B2 | 6/2006 | Jansen et al. | |
| 8,051,903 B2 | 11/2011 | Bauer | |
| 8,865,817 B2 * | 10/2014 | Futscher | .... C09J 11/06 524/413 |
| 2002/0198279 A1 | 12/2002 | Ha | |
| 2005/0245716 A1 | 11/2005 | Jansen et al. | |
| 2007/0219285 A1 * | 9/2007 | Kropp | .... C09J 4/06 522/7 |
| 2013/0317169 A1 * | 11/2013 | Futscher | .... C09J 11/06 524/714 |
| 2013/0338327 A1 * | 12/2013 | Hase | .... C08F 2/38 526/282 |
| 2014/0218509 A1 * | 8/2014 | Kondo | .... G01C 21/3647 348/118 |

FOREIGN PATENT DOCUMENTS

| | | | | |
|---|---|---|---|---|
| DE | 102008032882 A1 * | 1/2010 | .......... | C07F 9/1651 |
| DE | 102009012272 A1 | 9/2010 | | |
| WO | 2011051491 A1 | 5/2011 | | |

OTHER PUBLICATIONS

TIB Chemicals Catalyst Brochure. Retrieved online on [Mar. 14, 2016]. Retrieved from internet <URL://http://www.tib-chemicals.com/cms/upload/downloadcenter/Broschueren/english/TIB_Chemicals_-_Catalysts_Add-On.pdf>. no date found.*
Geniosil STP-E10 product overview from Wacker. [online]. Retrieved on Oct. 27, 2017. Retreived from internet <URL://https://www.wacker.com/cms/en/products/product/product.jsp?product=10182>.*
International Search Report for International Application No. PCT/CN2012/086317 dated Mar. 21, 2013.
ASTM International, Designation: D 1003, Standard Test Method for Haze and Luminous Transmittance of Transparent Plastics, 6 pages.

* cited by examiner

*Primary Examiner* — Sanza L. McClendon
(74) *Attorney, Agent, or Firm* — James E. Piotrowski

(57) ABSTRACT

Disclosed is an adhesive composition, comprising: (A) a silane terminated oligomer; (B) a (meth)acrylate monomer; (C) optionally a (meth)acrylate oligomer; (D) a photoinitiator; and (E) optionally an organometallic catalyst. The adhesive composition is both ultraviolet curable and moisture curable. Also disclosed is a method of applying the adhesive composition, comprising: (i) coating the adhesive onto the substrate to be bonded; (ii) laminating or stacking the substrate to be bonded to form an assembly; (iii) irradiating the assembly by ultraviolet irradiation; and (iv) placing the assembly under the room temperature. The adhesive composition is useful in display panels, touch panels and optical devices.

17 Claims, No Drawings

ULTRA-VIOLET-CURABLE AND MOISTURE-CURABLE ADHESIVE COMPOSITION

TECHNICAL FIELD

The present invention relates to an ultraviolet-curable and moisture-curable adhesive composition, the method of applying the adhesive composition and the use of the adhesive composition in display panels, touch panels and optical devices.

BACKGROUND ART

Currently, in many electronic industry fields, such as the manufacture of LCD touch panels, adhesives are used to bond various substrates and assemblies. Conventional adhesives used in such an application are ultraviolet (UV)-curable adhesives. However, complicated and special designs and opaque parts, such as those caused by ceramics and metals result in transparent areas and nontransparent shadow areas in display panel and touch panel devices. Since UV irradiation cannot efficiently reach the nontransparent shadow areas in the device when UV irradiation is used, the need for practical manufacture application cannot be fulfilled by means of typical UV-cure adhesives.

To solve the problem, there has been research attempting to use adhesives possessing both UV-cure and thermal-cure properties. For example, US20020198279 A1 discloses a UV-cure and thermal-cure adhesive. The adhesive composition comprises at least one of acrylate monomer, an acrylate oligomer and a thermal initiator. The adhesive composition is used as an adhesive for flat panel displays and optoelectronics components.

Besides the UV-cure adhesive and thermal-cure adhesive, moisture-cure adhesives are also conventional adhesives which can bond various kinds of substrates. For example, U.S. Pat. No. 7,060,750 B2 discloses an adhesive, sealant or coating composition, which comprises polyether urethanes containing reactive silane groups, i.e. silane-terminated polyurethanes. The composition can be moisture-cured in the presence of moisture-curing catalysts, such as titanates and organotin compounds, etc.

U.S. Pat. No. 6,828,355 B1 discloses a composition which can be both UV cured and moisture-cured. Such composition includes a polyorganosiloxane, having photocurable groups, such as (meth)acrylate and/or moisture-curable groups, such as alkoxy or aryloxy groups. The composition further includes a photoinitiator and moisture-cure catalyst such as organic titanium, organic tin and zirconium complexes. The composition can be used in the art of sealing and encapsulating of integrated circuits.

Due to the requirements related to bonding complicated-structure devices with both transparent and nontransparent areas in the field of panel display, touch panel and optoelectronics components, there is a continuing need for providing an easily applicable adhesive with combined cure functions. In addition to possess the above-mentioned quality, i.e., cure in the nontransparent areas, the adhesive must also have good qualities after being cured, such as: larger than about 90% of transparency, less than about 1% of haze, less than about 1 of b value, about 0.2-about 1.5 MPa adhesion strength and a viscosity adjustable over a large range.

SUMMARY OF INVENTION

To solve the problem in the art, the present invention provides a novel UV-curable and moisture-curable adhesive.

In one aspect, the present invention provides an adhesive composition, comprising, based on the total weight of the adhesive composition, (A) 20 wt %-60 wt % of a silane terminated oligomer; (B) 20 wt %-60 wt % of a (meth)acrylate monomer; (C) 0-50 wt % of a (meth)acrylate oligomer; (D) 0.5 wt %-5 wt % of a photoinitiator; and (E) 0-0.5 wt % of an organometallic compound catalyst, and optionally one or more additives, wherein the sum of the components is 100 wt %.

In one embodiment of the present invention, the silane terminated oligomer is a polyether urethane comprising at least one terminal alkoxysilyl group, in particular a polyether urethane wherein the two terminals of the molecular chain are alkoxysilyl groups.

In another embodiment of the present invention, the (meth)acrylate monomer is one or more selected from the group consisting of isobornyl (meth)acrylate, lauryl (meth)acrylate, hydroxyethyl (meth)acrylate, hydropropyl (meth)acrylate, hydrobutyl (meth)acrylate, isooctyl (meth)acrylate and tetrahydrofuranyl (meth)acrylate, and preferably is the combination of isobornyl (meth)acrylate and lauryl (meth)acrylate.

In a yet further embodiment of the present invention, the (meth)acrylate oligomer is an aliphatic urethane (meth)acrylate.

In a yet further embodiment of the present invention, the photoinitiator is one or more selected from the group consisting of benzil ketals, hydroxyl ketones, amine ketones and acylphosphine oxides photoinitiators, and preferably is the combination of 2-hydroxy-2-methyl-1-phenyl-1-acetone and diphenyl (2,4,6-triphenylbenzoyl)-phosphine oxide.

In a yet further embodiment of the present invention, the organometallic catalyst is one or more selected from the group consisting of stannous octanoate, dibutyltin dilaurate and dibutyltin diacetate.

In another aspect, the present invention provides a method of applying the above UV-curable and moisture-curable adhesive composition, comprising (i) coating the adhesive onto the substrate to be bonded; (ii) laminating or stacking the substrate to be bonded to form an assembly; (iii) irradiating the assembly by ultraviolet irradiation; and (iv) placing the assembly under the room temperature.

In a yet further aspect, the present invention provides the use of the adhesive composition according to the present invention in display panels, touch panels and optical devices.

Referring to the following description, examples and accompanying claims, other features, aspects and advantages of the present invention will be apparent.

DETAILED DESCRIPTION OF EMBODIMENTS

Unless otherwise defined, all technical and scientific terms used herein have the same meaning as commonly understood by one of ordinary skill in the art to which this invention belongs. In case of conflict, the present specification, including definitions, will control.

When an amount, concentration, or other value or parameter is given as either a range, a preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

Unless stated otherwise, all percentages, parts, ratios, etc., are by weight.

The term oligomer as used above and below refers to relatively low molecular weight polymeric compounds comprising at least two monomer units linked to each other. Preferably, the oligomer comprises 2 to 1000 monomer units per molecule, more preferred from 2 to 100 monomer units.

The term room temperature as used above and below refers to 23° C.

The invention is described in detail hereinafter.

According to one aspect, the present invention provides an adhesive composition, comprising, based on the total weight of the adhesive composition, (A) 20 wt %-60 wt % of a silane terminated oligomer; (B) 20 wt %-60 wt % of a (meth)acrylate monomer; (C) 0-50 wt % of a (meth)acrylate oligomer; (D) 0.5 wt %-5 wt % of a photoinitiator; and (E) 0-0.5 wt % of an organometallic compound catalyst, and optionally one or more additives, wherein the sum of the components is 100 wt %.

In the description and claims of the present invention, the "0 content" of a component represents that the adhesive composition according to the present invention does not contain such a component.

Silane Terminated Oligomer

In a broad sense, the silane terminated oligomer according to the present invention refers to an oligomer containing an alkoxysilyl group at end(s) of the molecule chain, and it contains at least one alkoxysilyl group as above mentioned bonded via the silicon atom at a terminal of the molecule; the two terminals of the molecule chain may be alkoxysilyl groups. Otherwise, the alkoxysilyl group may be present at one terminal and another functional group may appear on the other terminal, such as a (meth)acrylate, an ester, or an aliphatic hydrocarbyl group, etc.

In one embodiment of the present invention, the silane terminated oligomer is a polyether urethane terminated with alkoxysilyl groups at two terminals. The polyether urethane terminated with alkoxysilyl groups contains two or more alkoxysilyl groups and one or more polyether segment(s). The group bonded to silicon atom may include alkoxy, which is not particularly limited, and preferably is one or more selected from the group consisting of methoxy, ethoxy and propoxy.

Preferred alkoxysilyl groups are alkoxysilyl groups of the following formula:

—Si(OR$^1$)$_a$R$^2_{3-a}$, wherein a is an integer from 1 to 3, preferably from 2 to 3, particularly preferred 2; each R$^1$ is independently selected from C$_1$-C$_{10}$ alkyl, preferably methyl, ethyl, n-propyl, iso-propyl, and n-butyl, particularly preferred from methyl, and ethyl, and more particularly preferred each R$^1$ is methyl; and each R$^2$ is independently selected from C$_1$-C$_{10}$ alkyl, preferably methyl, ethyl, n-propyl, iso-propyl, and n-butyl, particularly preferred from methyl, and ethyl, and more particularly preferred each R$^2$ is methyl.

In one preferred embodiment of the present invention, the silane terminated oligomer contains two dimethoxy(methyl) silyl groups at the terminals of the molecule chain. The amount of the methoxy groups in the oligomer is preferably greater than about 0.4 mmol/g, particularly preferred about 0.4-about 0.7 mmol/g. The backbone of the preferred silane terminated oligomer is a polyether with urethane group on two sides. The number averaged molecule weight of the polyether chain is about 1000-about 20000 g/mol, preferably about 3000-about 15000 g/mol, and more preferably about 6000-about 12000 g/mol. The viscosity of the silane terminated oligomer is not particularly limited, but it may be within the range between about 1000 cps-500000 cps, preferably about 8000 cps-20000 cps.

In the adhesive composition according to the present invention, based on the total weight of the adhesive composition, the amount of the silane terminated oligomer is in the range of about 20 wt %-about 60 wt %, preferably about 30 wt %-about 50 wt %, and more preferably about 35 wt %-40 wt %.

Several silane terminated oligomers useful in the present invention are commercially available, and the examples thereof include the GENIOSIL STP-E series products from Wacker Chemie AG, such as GENIOSIL STP-E10. In addition, the silane terminated oligomers used in the present invention may be produced by a known process in the art, such as the process described in U.S. Pat. No. 7,060,750 B2.

(Meth)Acrylate Monomer

The (meth)acrylate monomer according to the present invention is not particularly limited. Herein, the term "(meth)acrylate monomer" includes, but is not limited to corresponding derivatives of acrylic acids and (meth)acrylic acids. The (meth)acrylate monomer according to the present invention refers to a single molecule of (meth)acrylate monomer, and the example includes, but is not limited to aliphatic (meth)acrylate monomer and epoxy (meth)acrylate monomer, etc. The (meth)acrylate monomer may be a monofunctional (meth)acrylate monomer, i.e., one (meth)acrylate group is contained in the molecule, or it can be a multifunctional (meth)acrylate monomer, i.e., two or more (meth) acrylate groups are contained in the molecule.

The monofunctional (meth)acrylate monomer includes e.g. butylene glycol mono(meth)acrylate, cyclohexyl (meth) acrylate, dicyclopentanyl (meth)acrylate, dicyclopentanyloxy ethyl (meth)acrylate, N,N-diethylaminoethyl (meth) acrylate, 2-ethoxyethyl (meth)acrylate, 2-hydroxyethyl (meth)acrylate, 2-hydroxypropyl (meth)acrylate, caprolactone modified (meth)acrylate, isobornyl (meth)acrylate, lauryl (meth)acrylate, acryloylmorpholine, N-vinylcaprolactam, nonylphenoxypolyethylene glycol (meth)acrylate, nonylphenoxypolypropylene glycol (meth)acrylate, phenoxy ethyl (meth)acrylate, phenoxy hydropropyl (meth) acrylate, phenoxy di(ethylene glycol) (meth)acrylate, polyethylene glycol (meth)acrylate and tetrahydrofuranyl (meth) acrylate.

The multifunctional (meth)acrylate monomer include e.g. 1,4-butylene glycol di(meth)acrylate, dicyclopentanyl di(meth)acrylate, ethylene glycol di(meth)acrylate, dipentaerythritol hexa(meth)acrylate, caprolactone modified dipentaerythritol hexa(meth)acrylate, 1,6-hexanediol di(meth)acrylate, neopentyl glycol di(meth)acrylate, pentaerythritol tri(meth)acrylate, polyethylene glycol di(meth)acrylate, tetraethylene glycol di(meth)acrylate, trimethylolpropane tri (meth)acrylate, tris(acryloyloxyethyl) isocyanurate, caprolactone modified tris(acryloyloxyethyl) isocyanurate, tris (methylacryloyloxyethyl) isocyanurate and tricyclodecane dimethanol di(meth)acrylate etc.

The monofunctional (meth)acrylate monomers and multifunctional (meth)acrylate monomers may be used individually or in the combination of two or more monomers, respectively, or the monofunctional (meth)acrylate monomer and multifunctional (meth)acrylate monomer can be combined to use.

In one preferred embodiment of the present invention, the (meth)acrylate monomer is isobornyl (meth)acrylate, lauryl (meth)acrylate or the combination thereof, more preferably the combination of isobornyl (meth)acrylate and lauryl (meth)acrylate.

In the adhesive composition of the present invention, based on the total weight of the adhesive composition, the amount of the (meth)acrylate monomer is in the range of about 20 wt %-about 60 wt %, preferably about 25 wt %-about 45 wt %, more preferably about 30 wt %-about 45 wt %.

The (meth)acrylate monomer used in the present invention may be commercially available, and the example includes isobornyl (meth)acrylate and lauryl (meth)acrylate from TCI Corporation. In addition, the (meth)acrylate monomer used in the present invention may be prepared according to a process known in the art.

(Meth)Acrylate Oligomer

The (meth)acrylate oligomer according to the present invention is not particularly limited, and the example includes polyurethane (meth)acrylate, polyester (meth)acrylate, epoxy novolac (meth)acrylate and aromatic polyurethane (meth)acrylate. In the present invention, polyurethane (meth)acrylate is preferably used as the (meth)acrylate oligomer. The polyurethane (meth)acrylate refers to the urethane polymers having (meth)acrylate groups. The polyurethane (meth)acrylate may be aliphatic polyurethane (meth) acrylate polymers. In the molecule units, it may contain one or more of (meth)acrylate group(s), and the (meth)acrylate group(s) may be present on the backbone or on branched chain(s). According to the present invention, aliphatic polyurethane (meth)acrylate oligomer is further preferred, in particular one having a viscosity of about 1000 cps-about 190000 cps, preferably about 4000 cps-about 120000 cps, more preferably about 8000 cps-about 20000 cps.

In the adhesive composition according to the present invention, the amount of the (meth)acrylate oligomer, based on the total weight of the adhesive composition, is in the range of 0-about 50 wt %, preferably about 15 wt %-about 45 wt %, more preferably about 20 wt %-about 40 wt %. In one embodiment of the present invention, the adhesive composition may not contain the (meth)acrylate oligomer.

The (meth)acrylate oligomer used in the present invention may be commercially available, and the example includes CN8004 from Sartomer Chemical Ltd. In addition, the (meth)acrylate oligomer used in the present invention may be prepared according to a process known in the art.

Photoinitiator

The photoinitiator is generally used to initiate the unsaturated monomers or oligomer to conduct photo-polymerization. According to the present invention, the photoinitiator is used to initiate crosslinking of the (meth)acrylate monomer and (meth)acrylate oligomer.

The photoinitiator used in the present invention may be any free radical initiator known in the art, and preferably is one or more selected from the group consisting of benzil ketals, hydroxyl ketones, amine ketones and acylphosphine oxides, such as 2-hydroxy-2-methyl-1-phenyl-1-acetone, diphenyl (2,4,6-triphenylbenzoyl)-phosphine oxide, 2-benzyl-dimethylamino-1-(4-morpholinophenyl)-butan-1-one, benzoin dimethyl ketal dimethoxy acetophenone, α-hydroxy benzyl phenyl ketone, 1-hydroxy-1-methyl ethyl phenyl ketone, oligo-2-hydoxy-2-methyl-1-(4-(1-methyvinyl)phenyl)acetone, benzophenone, methyl o-benzyl benzoate, methyl benzoylformate, 2-diethoxy acetophenone, 2,2-disec-butoxyacetophenone, p-phenyl benzophenone, 2-isopropyl thioxanthenone, 2-methylanthrone, 2-ethylanthrone, 2-chloroanthrone, 1,2-benzanthrone, benzoyl ether, benzoin ether, benzoin methyl ether, benzoin isopropyl ether, α-phenyl benzoin, thioxanthenone, diethyl thioxanthenone, 1,5-acetonaphthone, 1-hydroxycyclohexylphenyl ketone, ethyl p-dimethylaminobenzoate. These photoinitiators may be used individually or in combination thereof.

In one preferred embodiment of the present invention, the photoinitiator is the combination of 2-hydroxy-2-methyl-1-phenyl-1-acetone and diphenyl (2,4,6-triphenylbenzoyl)-phosphine oxide.

In the adhesive composition of the present invention, based on the total weight of the adhesive composition, the amount of the photoinitiator is about 0.5 wt %-about 5 wt %, preferably about 2 wt %-about 5 wt %.

The photoinitiator used in the present invention may be commercially available, and its examples include Irgacure 184 and Lucirin TPO from BASF Corporation.

Organometallic Catalyst

The organometallic catalyst according to the present invention is not particularly limited, but in the present invention, the organometallic catalyst is preferably such as stannous octanoate, dibutyltin dilaurate, dibutyltin diacetate etc. These organometallic catalysts are clear to pale yellow liquids, and can be used to accelerate the moisture-curing reaction. In one embodiment of the present invention, dibutyltin dilaurate is preferably used as the organometallic catalyst.

In the adhesive composition of the present invention, based on the total weight of the adhesive composition, the amount of the organometallic catalyst is 0-about 0.5 wt %, preferably about 0.2 wt %-about 0.5 wt %. According to the present invention, the adhesive composition may not contain the organometallic catalyst.

The organometallic catalyst used in the present invention may be commercially available, and the example includes Dabco T-12 from Air Products Corp.

In addition to the above components, the adhesive composition may further comprise additives selected from the group consisting of photostabilizer, thermal stabilizers, leveling agents, thickeners and plasticizers. A person skilled in the art would realize the detailed examples of each type of the additives. Preferably, the total amount of additives, based on the total weight of the adhesive composition, is from 0 to 5 wt %, more preferably 0 to 2 wt %, particularly preferred 0 to 1 wt %. In one particular embodiment the adhesive composition does not comprise any additive, i.e. the amounts of components (A), (B), (C), (D), and (E) sum up to 100 wt %.

The Preparation of the Adhesive Composition

The adhesive composition may be prepared by charging the starting materials into a stirred tank according to the desired amount ratio of the starting materials as mentioned above, and stirring at a certain speed for a period of time. The preparation process is generally conducted under normal temperature and pressure, and it is necessary to prevent light from irradiating on the materials in the tank, and it is also necessary to keep constant temperature. Taking the following Example 1 as an example, in a first step, the starting materials of (meth)acrylate oligomer CN8004, isobornyl (meth)acrylate and lauryl (meth)acrylate are charged into the tank to conduct pre-stirring. The stirring speed is set to about 50-about 80 rpm. The stirring time is about 60 min. In a second step GENIOSIL STP-E10 is charged into the tank for pre-stirring. The stirring speed is set to about 100-about 120 rpm, and the stirring time is about 20 min. In a third step 2-hydroxy-2-methyl-1-phenyl-1-acetone and diphenyl (2,4,6-triphenylbenzoyl)-phosphine oxide are charged into the tank for pre-stirring. The stirring speed is set to about 100-about 120 rpm, and the stirring time is about 20 min. Finally, the homogenized mixture is filtered for use. As for the preparation process of the product containing organometallic catalyst, the starting materials in a first step also contain the organometallic catalyst. In addition to the above steps, the preparation step includes a fourth step: evacuating the mixture in a vacuum stirring tank with a vacuum degree of about −100 kPa, and then stirring the mixture under vacuum at a speed of about 100-about 120 rpm for 20 min. After the stirring is completed, the homogenized mixture is filtered, and charged into a moisture blocking bag via a sealed duct to store in an airtight way.

The adhesive composition according to the present invention can be used in display panels, touch panels and optical devices.

EXAMPLES

Preparation Example

Following the above preparation process, adhesive compositions according to the present invention were obtained. Names and amounts of the components are listed in Table 1.

TABLE 1

| Adhesive component | Name | Component amount (wt %) | | | | | | | | |
|---|---|---|---|---|---|---|---|---|---|---|
| | | Example 1 | Example 2 | Example 3 | Example 4 | Example 5 | Example 6 | Example 7 | Comparative Example 1 | Comparative Example 2 |
| silane terminated oligomer | GENIOSIL STP-E10 | 30 | 30 | 50 | 20 | 60 | 35 | 40 | 10 | 70 |
| urethane (meth)acrylate oligomer | CN8004, aliphatic urethane (meth)acrylate oligomer | 40 | 40 | — | 45 | 15 | — | 20 | 60 | 10 |
| (meth)acrylate monomer 1 | isobornyl (meth)acrylate | 10 | 10 | 20 | 15 | 15 | 40 | 20 | 10 | 5 |
| (meth)acrylate monomer 2 | lauryl (meth)acrylate | 15 | 15 | 25 | 15 | 5 | 20 | 15 | 15 | 10 |
| photoinitiator 1 | 2-hydroxy-2-methyl-1-phenyl-1-acetone | 3 | 3 | 3 | 3 | 3 | 3 | 3 | 3 | 3 |
| photoinitiator 2 | diphenyl (2,4,6-triphenylbenzoyl)-phosphine oxide | 2 | 2 | 2 | 2 | 2 | 2 | 2 | 2 | 2 |
| organometallic catalyst | Dabco T12, organotin catalyst | — | 0.2 | — | — | — | 0.2 | 0.5 | — | — |

The method of Applying the Adhesive Composition

In another aspect, the present invention also provides the method of applying the adhesive composition, including the following steps:

(i) coating the adhesive onto the substrate to be bonded;
(ii) laminating or stacking the substrate to be bonded to form an assembly;
(iii) irradiating the assembly by ultraviolet irradiation; and
(iv) placing the assembly under the room temperature.

Specifically, the adhesive according to the present invention may be coated under pressure onto the surface of the substrate following the predetermined route by means of the needle cylinder of an automatic dispensing system. Subsequently, another substrate is laminated onto the adhesive, and the height difference between the two substrates is controlled by a dispenser, e.g., Dispenser KAR03, manufactured by IINUMA-GAUGE MFG LTD. After the adhesive is self-leveled on the whole bonding area, UV irradiation is conducted from top to bottom for curing. The UV lamp used may be such as Loctite UVALOC 1000, and the irradiation time may generally be about 5 s-about 30 s. Since the marginal areas are within the nontransparent part, it cannot be cured by UV irradiation. The bonded parts can be completely cured by storing the parts at room temperature for about 24 hours, according to the moisture-curable character of the present adhesive, without any need for additional equipment and processing. The substrate may be selected from the group consisting of woods, metals, plastics, papers, canvas, ceramics, stones, glass and concretes, and at least one of the surfaces to be bonded of the two substrates is plastic.

Performance Tests

The testing methods for the adhesive compositions in table 1 were detailed as follows.

Test 1—UV curing: The curing was conducted by means of UV source (Loctite UVALOC 1000, Henkel AG & Co. KGaA), with a UV irradiation having a wavelength between about 200 nm-about 400 nm, and a irradiation energy within about 3000 mJ/cm$^2$ or more. For example, when the irradiation power was about 100 mW/cm$^2$, each adhesive composition was irradiated for 30 s or more.

Test 2—Moisture curing under room temperature: After being bonded, the specimen were placed in a room conditioned to a constant temperature and humidity (23±2° C., 50±10% RH) under complete exclusion of light. To ensure exclusion of light, each specimen was covered by an aluminum-foil. After the intended time the curing results were inspected.

Test 3—Adhesion strength (adhesion force): The bonding strength between two substrates bonded by the composition according to one of the examples was tested after the composition was completely cured. Generally, the curing thickness was controlled to about 100 μm as required. The substrates were selected from glass plates, acrylic plates, polyester plates, etc. The testing equipment used was the Universal Testing System (Instron 5569, Instron Inc.). When testing, two slices of specimen plate attaching to each other were vertically stretched in opposite directions. The adhesion strength (MPa) was obtained by dividing the force value measured by the attaching areas.

Test 4—Transparency: the transparency values of the visual wavelength used to cure the composition materials were measured by applying a UV-vis spectrometer (Cary 300, Varian Inc.), and the curing thickness of the material was controlled to about 100 μm by two layers of the plastic plates. The measuring method complied with ASTM D1003-2007. Other related optical properties involving haze or b value, indicating the yellowness of the composition, were measured by the same method.

Test 5—Inspection of the shadow areas: the coated areas or attached parts were ascertained to be complete light-tight. After storage at room temperature for 24 hours, the specimen plate was separated for inspection.

Test Results

The test results of each prepared adhesive composition according to Table 1 by each test method are shown in Table 2.

would not show any failure, such as adhesive cracking and separation under the aging testing conditions of high temperature, thermal-cold cycling, etc. By comparison, Comparative Example 1 did not achieve the moisture-curing effect under room temperature, and it was found that even after 24 hours, the composition of the Comparative Example 1 was liquid. In addition, Comparative Example 2 did not achieve UV-curing, and its adhesion strength after moisture-curing under room temperature was significantly lower than the examples according to the present invention.

What is claimed is:

1. An adhesive composition consisting of, based on the total weight of the adhesive composition,

TABLE 2

| | Test method | Example 1 | Example 2 | Example 3 | Example 4 | Example 5 | Example 6 | Example 7 | Comparative example 1 | Comparative example 2 |
|---|---|---|---|---|---|---|---|---|---|---|
| Test 1 | UV curing (room temperature, between glass and PC) 30 s@UVA (100 mW/cm$^2$) | cured within 30 s | cured within 30 s | cured within 30 s | cured within 30 s | cured within 30 s | cured within 30 s | cured within 30 s | cured within 30 s | partially cured within 30 s |
| Test 2 | Moisture-curing under room temperature (lighttight, between glass plate and PMMA plate) (25° C., 50% RH) | cured within 24 h | cured within 1 h | cured within 24 h | cured within 24 h | cured within 12 h | cured within 2 h | cured within 2 h | uncured | cured within 24 h |
| Test 3 | Adhesion strength (glass plate to glass plate, curing 30 s @UVA, 100 mW/cm$^2$) | >0.6 MPa | >0.6.MPa | >0.4 MPa | >0.6 MPa | >0.4 MPa | >0.6 MPa | >0.6 MPa | >0.6 MPa | >0.2 MPa |
| Test 4 | Transparency (glass plate to glass plate, curing 30 s @UVA, 100 mW/cm$^2$) | >92% | >92% | 92% | >92% | >92% | 92% | 92% | >92% | 92% |
| Test 5 | Shadow area inspection | cured | cured | cured | cured | cured | cured | cured | liquid | cured |

Evaluation

As shown in table 2, all of Examples 1-7 achieved both UV curing (100 mW/cm$^2$, 30 s) and moisture-curing under room temperature (25° C. and 50% RH, within 24 h). In addition, the adhesion compositions according to the present invention had good properties after curing, such as a transparency of more than 90%, a haze less than 1% and a "b" value less than 1, which indicated that all the examples according to the present invention showed great optical properties. Moreover, the adhesive compositions according to the present invention possessed an adhesion strength of about 0.2-about 1.5 MPa and a adjustable viscosity in a large range after curing. Particularly in Example 2, in the case of a conventional accomplishment of UV curing, the adhesive composition was completely moisture-cured by placing under room temperature in one hour only, and the adhesive composition had an adhesive strength of larger than about 0.6 MPa. Under conventional circumstances, such an adhesive strength is sufficient to ensure that the working piece (A) 20 wt %-60 wt % of a silane terminated oligomer that is a polyether urethane comprising at least one terminal alkoxysilyl group;
(B) 25 wt %-45 wt % of a (meth)acrylate monomer comprising a combination of isobornyl (meth)acrylate monomer and lauryl (meth)acrylate monomer;
(C) 15-45 wt % of an aliphatic urethane (meth)acrylate oligomer;
(D) 0.5 wt %-5 wt % of a photoinitiator;
(E) optionally up to 0.5 wt % of an organotin catalyst; and
optionally one or more additives selected from the group consisting of photostabilizer, thermal stabilizer, leveling agent, thickener and plasticizer;
wherein the sum of the components is 100 wt %.

2. The adhesive composition according to claim 1, wherein the silane terminated oligomer is a polyether urethane comprising at least one terminal dimethoxy(methyl) silyl group and a 2-8 carbon alkylene group linking the dimethoxy(methyl)silyl group to the urethane.

3. The adhesive composition according to claim 1, containing, based on the total weight of the adhesive composition, 30 wt %-50 wt % of the silane terminated oligomer.

4. The adhesive composition according to claim 1, containing, based on the total weight of the adhesive composition, 35 wt %-40 wt % of the silane terminated oligomer.

5. The adhesive composition according to claim 1, wherein the (meth)acrylate monomer further comprises one or more selected from the group consisting of hydroxyethyl (meth)acrylate, hydroxypropyl (meth)acrylate, hydroxybutyl (meth)acrylate, isooctyl (meth)acrylate and tetrahydrofuranyl (meth)acrylate.

6. The adhesive composition according to claim 5, wherein the (meth)acrylate monomer consists of the combination of isobornyl (meth)acrylate and lauryl (meth)acrylate.

7. An adhesive composition consisting of, based on the total weight of the adhesive composition,
(A) 20 wt %-60 wt % of a silane terminated oligomer that is a polyether urethane comprising at least one terminal alkoxysilyl group;
(B) 20 wt %-60 wt % of a (meth)acrylate monomer comprising a combination of isobornyl (meth)acrylate monomer and lauryl (meth)acrylate monomer;
(C) 15 wt %-45 wt % of an aliphatic urethane (meth)acrylate oligomer;
(D) 0.5 wt %-5 wt % of a photoinitiator; and
(E) 0.2-0.5 wt % of an organotin catalyst and
optionally one or more additives selected from the group consisting of photostabilizer, thermal stabilizer, leveling agent, thickener and plasticizer;
wherein the sum of the components is 100 wt %.

8. The adhesive composition according to claim 1, containing, based on the total weight of the adhesive composition, 20 wt %-40 wt % of the (meth)acrylate oligomer.

9. The adhesive composition according to claim 1, wherein the photoinitiator is one or more selected from the group consisting of benzil ketals, hydroxyl ketones, amine ketones and acylphosphine oxide photoinitiator.

10. The adhesive composition according to claim 9, wherein the photoinitiator is the combination of 2-hydroxy-2-methyl-1-phenyl-1-acetone and diphenyl (2,4,6-triphenylbenzoyl)-phosphine oxide.

11. The adhesive composition according to claim 1, containing, based on the total weight of the adhesive composition, 2 wt %-5 wt % of the photoinitiator.

12. The adhesive composition according to claim 1, wherein the organotin catalyst is present and is one or more selected from the group consisting of stannous octanoate, dibutyltin dilaurate and dibutyltin diacetate.

13. The adhesive composition according to claim 1, wherein the organotin catalyst is present and is dibutyltin dilaurate.

14. The adhesive composition according to claim 1, containing, based on the total weight of the adhesive composition, 0.2 wt %-0.5 wt % of the organotin catalyst.

15. A method of applying the adhesive composition of claim 1, comprising:
(i) coating the adhesive onto the substrate to be bonded;
(ii) laminating or stacking the substrate to be bonded to a second substrate thereby forming an assembly;
(iii) irradiating the assembly by ultraviolet irradiation; and
(iv) storing the assembly at room temperature.

16. A display panel, touch panel or optical device comprising the adhesive of claim 1 or cured reaction products of the adhesive of claim 1.

17. Cured reaction products of the adhesive composition of claim 1.

* * * * *